(12) United States Patent
Fujii et al.

(10) Patent No.: US 11,813,693 B2
(45) Date of Patent: Nov. 14, 2023

(54) FRICTION STIR WELDING TOOL MEMBER, AND FRICTION STIR WELDING METHOD USING THE SAME

(71) Applicants: OSAKA UNIVERSITY, Suita (JP); TOSHIBA MATERIALS CO., LTD., Yokohama (JP)

(72) Inventors: Hidetoshi Fujii, Osaka (JP); Yoshiaki Morisada, Osaka (JP); Kai Funaki, Kanagawa (JP); Masahiro Kato, Kanagawa (JP); Takayuki Fukasawa, Kanagawa (JP); Yutaka Abe, Kanagawa (JP)

(73) Assignees: OSAKA UNIVERSITY, Suita (JP); TOSHIBA MATERIALS CO., LTD., Yokohama (JP)

(*) Notice: Subject to any disclaimer, the term of this patent is extended or adjusted under 35 U.S.C. 154(b) by 182 days.

(21) Appl. No.: 17/230,358

(22) Filed: Apr. 14, 2021

(65) Prior Publication Data
US 2021/0229210 A1    Jul. 29, 2021

Related U.S. Application Data

(63) Continuation of application No. PCT/JP2019/040211, filed on Oct. 11, 2019.

(30) Foreign Application Priority Data

Oct. 15, 2018  (JP) .................................. 2018-194365

(51) Int. Cl.
*B23K 20/00* (2006.01)
*B23K 20/12* (2006.01)

(52) U.S. Cl.
CPC .............................. *B23K 20/1255* (2013.01)

(58) Field of Classification Search
CPC .. B23K 20/1255; B23K 20/12; B23K 20/127; B23K 20/227; B23K 2101/18;
(Continued)

(56) References Cited

U.S. PATENT DOCUMENTS 11,130,194 B2 * 9/2021 Fujii ...................... B23K 20/12
11,534,854 B2 * 12/2022 Fujii .................. B23K 20/1255
(Continued)

FOREIGN PATENT DOCUMENTS

JP      2000-094158 A    4/2000
JP      2001-205454 A    7/2001
(Continued)

OTHER PUBLICATIONS

Yu. G. Gogotsi, "Review Particulate silicon nitride-based composites", Journal of Materials Science 29 (1994) 2541-2556 (16 pages).

*Primary Examiner* — Erin B Saad
(74) *Attorney, Agent, or Firm* — Foley & Lardner LLP (57) ABSTRACT

A friction stir welding tool member according to the present embodiment has a shoulder portion and a probe portion concentrically projecting from an upper surface of the shoulder portion. The shoulder portion includes a curved surface processed portion that is curved to have a curved shape on an outer peripheral edge of the shoulder portion. A space occupancy occupied by the two-dimensional space in which neither the shoulder portion nor the probe portion exists is in a range of 30% to 70%, the space occupancy being determined based on a projection drawing of a side surface region surrounded from a tip of the probe portion to the curved surface processed portion of the shoulder portion.

9 Claims, 3 Drawing Sheets

(58) Field of Classification Search
CPC .............. B23K 2103/04; B23K 20/122; B23K 20/126; B23K 20/1265; B23K 2103/02; B23K 2103/14
See application file for complete search history.

(56) References Cited

U.S. PATENT DOCUMENTS

2017/0151625 A1\* 6/2017 Utsumi ................. B23K 20/12
2019/0210149 A1   7/2019 Fujii et al.
2020/0238434 A1\* 7/2020 Matsushita ........ B23K 20/1255

FOREIGN PATENT DOCUMENTS

| JP | 2013-163208 A | 8/2013 |
| JP | 2016-064419 A | 4/2016 |
| JP | 2018-140444 A | 9/2018 |
| WO | WO-2018/030309 A1 | 2/2018 |

\* cited by examiner

# FRICTION STIR WELDING TOOL MEMBER, AND FRICTION STIR WELDING METHOD USING THE SAME

CROSS-REFERENCE TO RELATED APPLICATION

This application is a continuation of PCT Application No. PCT/JP2019/040211, filed on Oct. 11, 2019, which is based upon and claims the benefit of priority from Japanese Patent Application No. 2018-194365, filed on Oct. 15, 2018 the entire contents of each of which are incorporated herein by reference.

FIELD

Embodiments described later relate to a friction stir welding tool member and a friction stir welding method using the same.

BACKGROUND

Friction stir welding (FSW) is a welding method in which a welding tool member called a probe is pressed against a member while being rotated at high speed, and members are integrated by utilizing the frictional heat generated in the pressing portion. The frictional heat softened the members (base material), and the rotational force of the probe caused plastic flow in the periphery of a welding portion, thereby integrating the members (base material and mating material). Therefore, the friction stir welding can be regarded as a kind of solid phase welding.

Friction stir welding is a solid phase welding that requires less heat input to the welding portion, so the degree of softening and strain of the welding target portion is small. Further, in friction stir welding, since a brazing material for welding is not required, cost reduction can be expected. The welding tool member for friction stir welding requires abrasion resistance that can withstand high-speed rotation and heat resistance that can withstand frictional heat.

Friction stir welding includes a point-welding method and a line-welding method.

The point-welding is a method of welding a welded material, that is, a material to be welded at a point. In the point-welding, friction stir welding is performed while pushing the tool member vertically into the welded material. Therefore, a welding mark is a circular point. Further, the line-welding method is a method of pushing the tool member into the welded material while moving in a certain direction. Therefore, the welding mark is linear. The line-welding is used in technical fields where increasing the welding strength is required because the welding portion can be enlarged.

Figure 1:
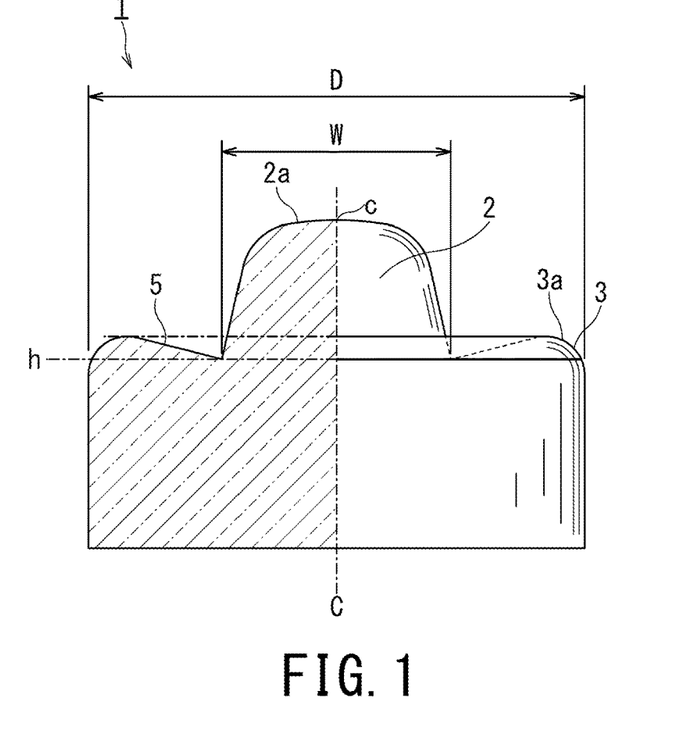
FIG. 1 is a half cross-sectional diagram showing an example of a friction stir welding tool member according to an embodiment.

FIG. 1 of JP-A-2000-94158 (Patent Document 1) shows that the line-welding is performed while tilting the tool member. Paragraph [0007] of Patent Document 1 describes that the inclination angle of the tool member should be within 5 degrees. The tool member of Patent Document 1 is provided with: a pin having a small diameter; a cylindrical protruding shoulder having a diameter larger than the pin; and a cylindrical shoulder having a diameter larger than that of the protruding shoulder. It is disclosed that such a structure can suppress the generation of burrs and omit the cutting step after welding.

However, Patent Document 1 is for friction stir welding of aluminum or an aluminum alloy. Although this technique is effective for relatively soft metals such as aluminum, when being applied to hard materials such as iron alloys, the durability of the tool member will be decreased.

When the tool member is tilted, the outer peripheral portion of the tool member mainly comes into contact with the welded material. Therefore, the outer peripheral portion of the tool member is easily damaged, which causes a decrease in life. In particular, when the line-welding is performed on iron alloys, the life is greatly decreased.

DETAILED DESCRIPTION

A friction stir welding tool member according to the present embodiment has a shoulder portion and a probe portion concentrically protruding from an upper surface of the shoulder portion. The shoulder portion includes a curved surface processed portion that is curved to have a curved shape on an outer peripheral edge of the shoulder portion. A space (emptiness) occupancy (that is, area ratio) occupied by the two-dimensional space in which neither the shoulder portion nor the probe portion exists is in a range of 30% to 70%, the space occupancy being determined based on a projection drawing (e.g., projection from the side) of a side surface region surrounded from a tip of the probe portion to the curved surface processed portion of the shoulder portion.

In other words, a friction stir welding tool member according to the present embodiment has a shoulder portion and a probe portion concentrically protruding from an upper surface of the shoulder portion. The shoulder portion includes a curved surface processed portion that is curved to have a curved shape on an outer peripheral edge of the shoulder portion. By projecting the friction stir welding tool member from a side direction (center projection or parallel projection), in a rectangular side surface region where a tip of the probe portion and an outermost part of the curved surface processed portion are diagonal points, a space occupancy (that is, area ratio) of the two-dimensional space in which neither the shoulder portion nor the probe portion exists is in a range of 30% to 70%. Further, when the friction stir welding tool member is projected from the side surface direction, the shoulder angle is preferably in the range of −15° or more and +15° or less. The shoulder angle is formed by an inclined line from a root of the probe portion to the curved surface processed portion and an orthogonal line orthogonal to a central axis of the probe portion (or a friction stir welding tool member). The above-mentioned rectangular side surface region may be acquired as the first side surface region element, and the first side surface region element and the second side surface region element, being linearly symmetrical with the first side surface region element about the central axis of the probe portion, may be combined to form a rectangular side surface region.

In other words, the friction stir welding tool member according to the embodiment has a shoulder portion and a probe portion that protrudes concentrically from the upper surface of the shoulder portion. The shoulder portion of the friction stir welding tool member includes a curved surface processed portion that is curved to have a curved shape on an outer peripheral edge of the shoulder portion. A space occupancy (that is, volume fraction) of the three-dimensional space in which neither the shoulder portion nor the probe portion exists is in a range of 30% to 70% with respect to a cylindrical region (or semi-cylindrical region). The cylindrical region is formed by a circular lower surface having an arc on the outermost side of the curved surface processed portion and a circular upper surface centered at the tip of the probe portion.

A friction stir welding tool member 1 according to the present embodiment has a shoulder portion 3 and a probe portion 2 concentrically protruding from an upper surface of the shoulder portion 3. In the friction stir welding tool member 1, the shoulder portion 3 includes a curved surface processed portion that is curved to have a curved shape on an outer peripheral edge of the shoulder portion. A space (emptiness) occupancy (that is, area ratio) occupied in two-dimensional space S in which neither the shoulder portion nor the probe portion exists is in a range of 30% to 70%. The space occupancy is determined based on a projection drawing of a side surface region 4 surrounded from a tip c of an end surface 2a of the probe portion 2 to the curved surface processed portion 3a.

In other words, a friction stir welding tool member 1 according to the present embodiment has a shoulder portion 3 and a probe portion 2 concentrically protruding from an upper surface of the shoulder portion 3. In the friction stir welding tool member 1, the shoulder portion 3 includes a curved surface processed portion 3a that is curved to have a curved shape on an outer peripheral edge of the shoulder portion 3. By projecting the friction stir welding tool member 1 from a side direction (center projection or parallel projection), in a rectangular side surface region where a tip c of the probe portion 2 and an outermost part P of the curved surface processed portion 3a are diagonal points, a space occupancy (that is, area ratio) of the two-dimensional space in which neither the shoulder portion 3 nor the probe portion 2 exists is in a range of 30% to 70%. Further, when the friction stir welding tool member 1 is projected from the side surface direction, the shoulder angle α is preferably in the range of −15° or more and +15° or less. The shoulder angle α is an angle formed by an inclined line from a root of the probe portion 2 to the curved surface processed portion 3a and an orthogonal line orthogonal to a central axis of the probe portion 2 (or a friction stir welding tool member). The above-mentioned rectangular side surface region 4 may be acquired as the first side surface region element 4, and the first side surface region element 4 and the second side surface region element (not shown), being linearly symmetrical with the first side surface region element 4 about the central axis C of the probe portion 2, may be combined to form a rectangular side surface region. Explaining with reference to FIG. 2, the second side surface region element will be on the left side of the central axis C and in contact with the central axis C. Hereinafter, the "friction stir welding tool member" may be simply referred to as a "tool member".

FIG. 1 is a half cross-sectional diagram showing a configuration example of a friction stir welding tool member according to an embodiment. In the figure, reference numeral "1" is a friction stir welding tool member, reference numeral "2" is a probe portion, reference numeral "3" is a shoulder portion, reference numeral "3a" is a curved surface processed portion of the shoulder portion 3, reference numeral "D" is an outer diameter of the shoulder portion 3, and reference numeral "W" is an outer diameter of the probe portion 2.

The probe portion 2 is also called a tip portion. The probe portion 2 has a protruding shape protruding from the end surface of the shoulder portion 3. The probe portion 2 and the shoulder portion 3 are integrally and concentrically formed. Further, an end surface 2a of the probe portion 2 is formed in a curved shape, a flat shape, or the like. When the end surface 2a of the probe portion 2 is in a curved shape, the life of the tool member is longer. The "curved shape" is also called an "R shape".

Further, the shoulder portion 3 refers to a region from a root of the probe portion 2 to the outer circumference of the tool member. The curved surface processed portion 3a is formed on an outer peripheral edge portion of the shoulder portion 3 so as to have a curved shape. At least one curved surface processed portion (curved shape portion) 3a is provided in the region from the root of the probe portion 2 to the outer circumference of the tool member. Further, when the cross section is divided into two by the central axis C of the probe portion 2, it is preferable that each cross-sectional shape is symmetrical. The tool member 1 presses the welded material while rotating. Since the tool member 1 is symmetrical, the friction stir force can be stabilized.

Further, the probe portion 2 is a member that enters the welded material while rotating. The shoulder portion 3 is also a member that enters into the welded material, and is distinguished from a pressing member that simply protects the probe portion 2. The shoulder portion 3 may be rotated with the probe portion 2 or may be a non-rotating shoulder portion. Further, the shoulder portion 3 may have an integrated structure integrated with the probe portion 2, or may have a composite structure in which the probe portion 2 and the shoulder portion 3 are formed of different members. Further, when the shoulder portion 3 has a composite structure, the probe portion 2 and the shoulder portion 3 may be formed of different materials. When the shoulder portion 3 is a non-rotating shoulder portion, there can be forms of a cylindrical shape, a partially cylindrical shape, and the like. As to the cylindrical shape, the shoulder portion 3 is provided to cover the entire circumference of the base of the probe portion 2. As to the partial cylindrical shape, if the cylindrical circle is considered 100%, the shoulder portion 3 is made to have a partially cylindrical shape of less than 100%.

As will be described later, the line-welding is performed by pressing the tool member 1 against the welded material in an inclined state while moving the pressed portion. It is possible to increase the friction stir force by moving the tilted tool member 1. By providing the curved surface processed portion (curved shape portion) 3a on the shoulder portion 3, it is possible to relax the stress acting on the shoulder portion 3.

Further, the tool member 1 is characterized by having a space occupancy in the range of 30 to 70%. The space occupancy is acquired from the projection drawing of a side surface region 4 surrounded from the tip c (on the central axis C) of the probe portion 2 to the curved surface processed portion 3a of the shoulder portion 3. That is, the tool member 1 is characterized by having a space occupancy, when the tool member 1 is projected from the side surface direction, in the range of 30 to 70% in a rectangular side surface region 4 having the tip c of the probe portion 2 and an outermost P of the curved surface processing portion 3a as diagonal points. In the tool member 1 according to the embodiment, the shoulder portion 3 is curved and the space occupancy is under control. As a result, even if the tool member 1 is pressed against the welded material in an inclined state, it is possible to suppress damage and extend the life. Further, as will be described later, the life of the tool member 1 can be further extended by forming the tool member 1 with a silicon nitride sintered body.

Figure 2:
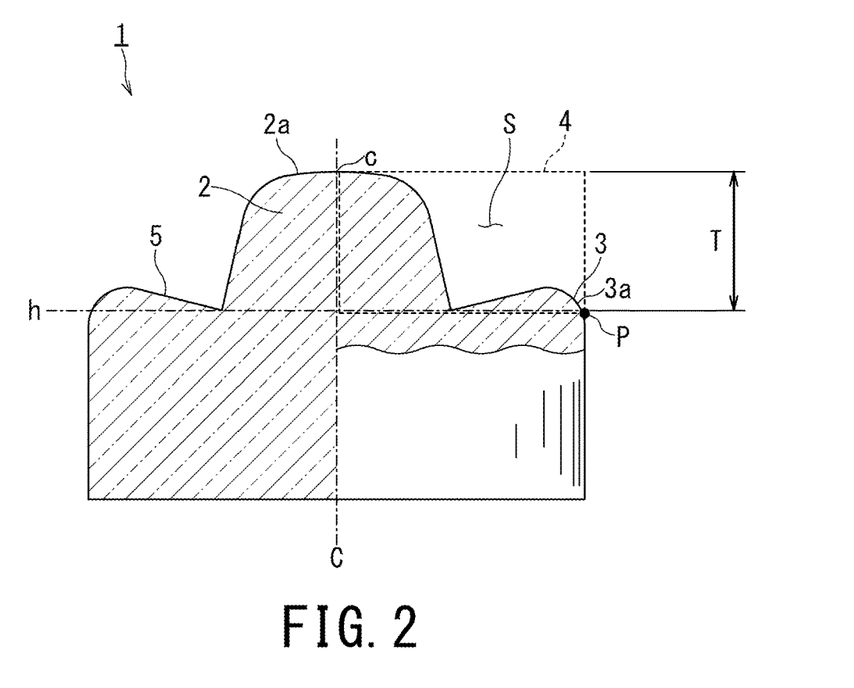
FIG. 2 is a partial cross-sectional conceptual diagram showing an example of a two-dimensional space in which the friction stir welding tool member according to the embodiment does not exist.

FIG. 2 is a partial cross-sectional view of the tool member 1. The outer shape of the tool member 1 in the partial cross-sectional view can also be interpreted as the outer shape of the tool member 1 in the projection drawing projected from the side surface direction. In the figure, reference numeral "1" is a tool member, reference numeral "2" is a probe portion, reference numeral "3" is a shoulder portion, reference numeral "3a" is a curved surface processed portion of the shoulder portion "3", reference numeral "4" is a side surface region, and reference numeral "T" is the height of the probe portion 2. A photo of the tool member 1 taken from the side surface direction may be used as the projection drawing of the side surface region 4 surrounded from the tip c of the probe portion 2 to the curved surface processed portion 3a of the shoulder portion 3 of the tool member 1.

In this embodiment, the space occupancy is calculated as a cross-sectional space of the space S occupying the side surface region represented by the following horizontal axis length and vertical axis length. It is considered the structure of the tool member 1 being axisymmetric about the central axis C. Therefore, the horizontal axis length can be based on the length from the left-right position of the tip c of the probe portion 2 to the left-right position of the side surface where the shoulder portion 3 is straightened (half of the outer diameter D). The horizontal axis length is the horizontal side of the rectangular side surface region 4.

The vertical axis length is the height from the height position of the outermost P of the curved surface processing portion 3a to the position having the height as the tip c of the probe portion 2. The outermost P of the curved surface processed portion 3a forms a circle on the three-dimensional region and forms a point on the vertical cross section or a projection surface. The vertical axis length is the vertical side of the rectangular side surface region 4. That is, as shown in FIG. 2 (the same applies to FIG. 4), the side surface region 4 as represented with "the horizontal axis length×the vertical axis length" is a rectangular region surrounded by a dotted line in the vertical cross-sectional view.

If the outer shape of the tool member 1 in the partial cross-sectional view of FIG. 2 is interpreted as the outer shape of the tool member 1 in the projection drawing, the ratio of the space S (the space other than the probe portion 2 and the shoulder portion 3) in the side surface region 4 surrounded by the dotted line is called the space occupancy. The space S is an area where the tool member 1 does not exist. In FIG. 2, since the shoulder angle described later is positive, it is possible to match the height T of the probe portion 2 with the vertical axis length. However, in FIG. 4, since the shoulder angle is negative, the height T of the probe portion 2 cannot be matched with the vertical axis length.

That is, the space occupancy (I) is calculated by the following formula.

Space occupancy (%)=[[(horizontal axis length×vertical axis length)−(area of tool member)]/(horizontal axis length×vertical axis length)]×100

The space occupancy being 0% means that the side surface region 4 in the projection drawing is a square and the tool member is in cylindrical shape. Further, the vertical axis length will be the height T of the probe portion 2 in FIG. 2.

When the space occupancy is in the range of 30 to 70% in terms of area ratio, it is possible to acquire the stirring effect of both the probe portion 2 and the shoulder portion 3. When the space occupancy is less than 30%, the outer diameter W of the probe portion is too large with respect to the outer diameter D of the shoulder portion 3, and the stirring effect of the shoulder portion 3 is reduced. If the space occupancy exceeds 70%, the probe portion 2 is too small and the stirring effect of the probe portion 2 will be insufficient. Therefore, the space occupancy is preferably 30% to 70%, more preferably 40% to 60%.

Figure 3:
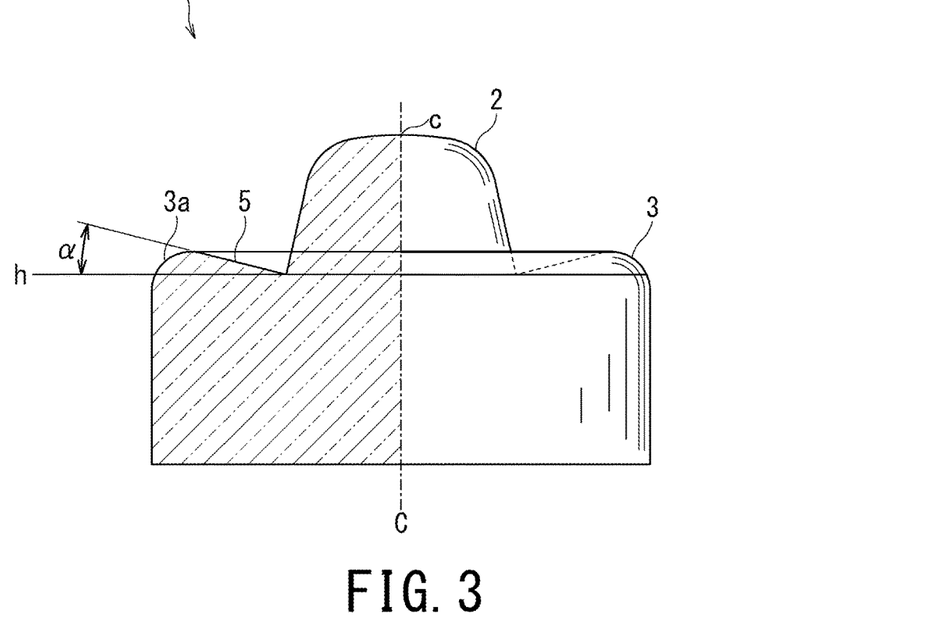
FIG. 3 is a half cross-sectional diagram showing an example of the shoulder angle of the friction stir welding tool member according to the embodiment.
Figure 4:
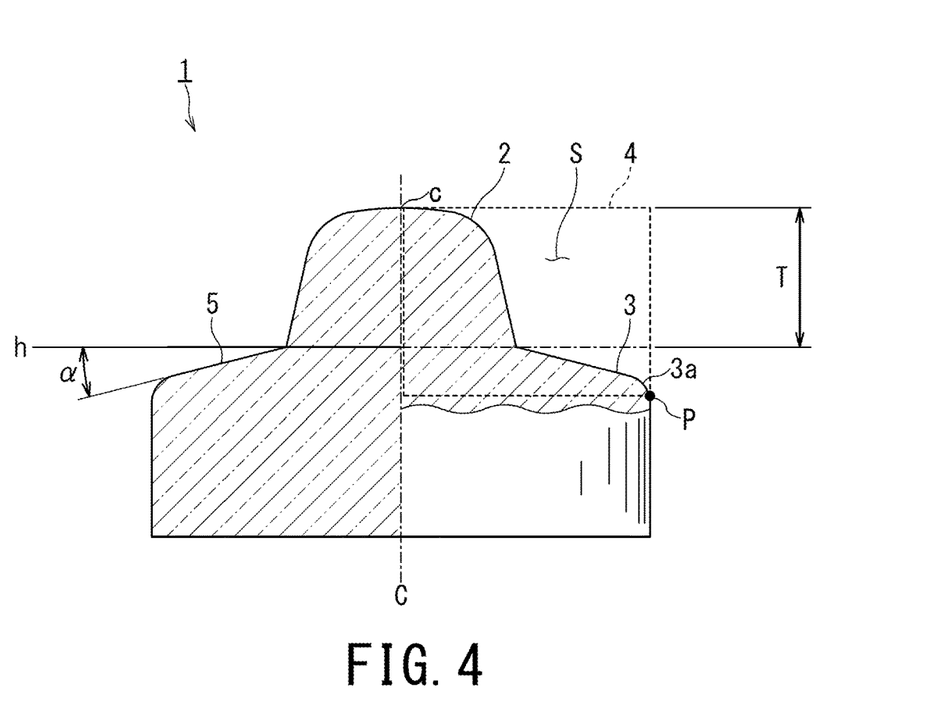
FIG. 4 is a partial cross-sectional diagram showing another example of the shoulder angle of the friction stir welding tool member according to the embodiment.

Further, an inclined surface 5, from the root of the probe portion 2 to the curved surface processed portion (curved shape portion) 3a of the shoulder portion 3, and the orthogonal surface h, being orthogonal to the central axis C of the tool member 1, form a shoulder angle (angle of an inclined surface 5 to the orthogonal surface h) a, which is preferably in the range of −15° to +15°. If the outer shape of the tool member 1 in the partial cross-sectional views of FIGS. 3 and 4 is interpreted as the outer shape of the tool member 1 in the projection drawing, an inclined line 5, from the root of the probe portion 2 to the curved surface processed portion 3a of the shoulder portion 3, and an orthogonal line h, being orthogonal to the central axis C of the tool member 1, form a shoulder angle (angle of the inclined line 5 to the orthogonal line h) a, which is preferably in the range of −15° to +15°. A conceptual diagram of the shoulder angle is shown in each of FIGS. 3 and 4. The orthogonal surface h is shown as an orthogonal line h on the vertical cross section.

The shoulder angle is the angle of the inclined surface 5 from the root of the probe portion 2 to the curved surface processed portion (curved shape portion) 3a of the shoulder portion 3. That is, the orthogonal surface h indicates the horizontal direction in FIGS. 1 to 4. Each of FIGS. 1 to 3 shows a case where the shoulder angle is positive, and FIG. 4 shows a case where the shoulder angle is negative. A positive shoulder angle α shows the inclined surface rising toward the outside. A negative shoulder angle α shows the inclined surface descending toward the outside. When it is horizontal with no inclined surface, the shoulder angle α is 0°.

When the shoulder angle α is positive, the stirring force by the shoulder portion 3 becomes larger. On the other hand, if the shoulder angle α exceeds ±15°, the stirring stress acting on the shoulder portion 3 becomes too large, which decreases the durability of the shoulder portion. In order to increase the stirring force of the shoulder portion 3, the shoulder angle α is preferably to exceed 0° and is +15° or less, and is more preferably 3° to 10°.

When the shoulder angle α is negative, it is possible to reduce the stress acting on the shoulder portion 3, thereby improving the durability of the tool member 1. When the shoulder angle α is negative, though the stirring force may be decreased, the durability of the tool member can be improved. If the shoulder angle α is over −15° (the negative angle becomes larger), the stirring force becomes too low. Therefore, the shoulder angle is preferably smaller than 0° and is −15° or more, and is more preferably −3° or more and −10° or less.

That is, the shoulder angle α is preferably made positive when it is desired to increase the stirring force, and is preferably made negative when it is desired to improve the durability.

Further, the outer diameter D of the shoulder portion 3 is preferably 5 mm or more and 30 mm or less. The outer diameter W of the probe portion 2 is preferably 2 mm or more and 15 mm or less. If the outer diameter D of the shoulder portion 3 is less than 5 mm, the tool member 1 may become too thin and the durability may decrease. When an iron alloy is used as the welded material, the durability of the tool member 1 is required because the iron alloy is a hard material. If the outer diameter D of the shoulder portion 3 is larger than 30 mm, the stirring marks become too large, and the appearance of the stirring marks tends to be uneven. If the outer diameter W of the probe portion 2 is less than 2 mm, the stirring effect of the probe portion 2 may be insufficient. If the diameter W of the probe portion 2 is larger than 15 mm, the shoulder portion 3 becomes relatively small, and the stirring effect of the shoulder portion 3 may be insufficient.

The ratio of the outer diameter W of the probe portion 2 to the outer diameter D of the shoulder portion 3 is preferably in the range of 0.2 to 0.6. Within this range, it is possible to acquire the stirring effect of both the probe portion 2 and the shoulder portion 3.

Figure 5:
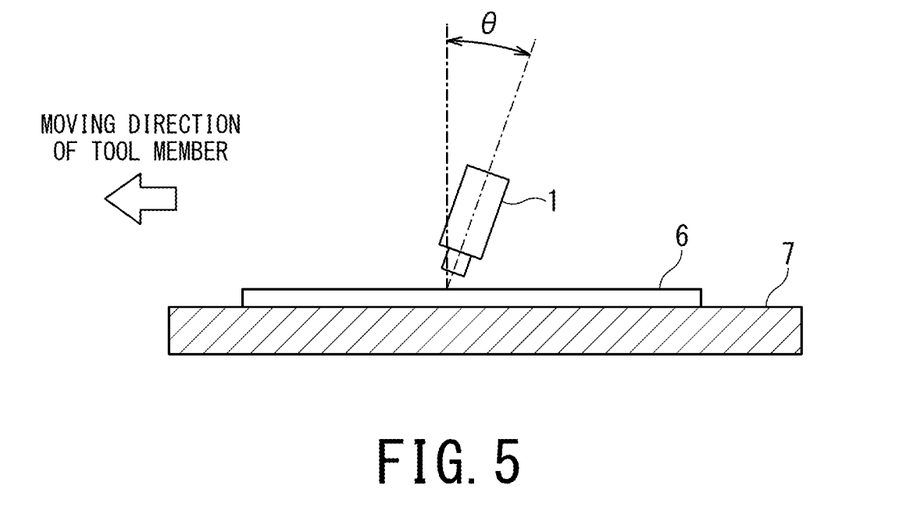
FIG. 5 is a side view showing an example of a friction stir welding method according to the embodiment.

Further, the height T (mm) of the probe portion 2 is preferably 0.2 mm or more smaller than the thickness of the welded material (e.g., the welded material 6 shown in FIG. 5). For example, when the thickness of the welded material is 2 mm, the height T (mm) of the probe portion 2 is preferably 1.8 mm or less (=2 mm−0.2 mm). The thickness of the welded material is the total thickness of the welded materials. For example, when two SUS plates having a thickness of 1 mm are stacked and welded, the thickness of the welded material is 2 mm (=1 mm×2 sheets). When two SUS plates having a thickness of 2 mm are stacked and welded, the thickness of the welded material is 4 mm. When two SUS plates are stacked and welded, the height T of the probe portion 2 is larger than the thickness of the first SUS plate. That is, when multiple welded materials are stacked and welded, the height T of the probe portion 2 is preferably set to a size that does not penetrate the last (innermost) welded material. Further, when two sheets of the welded materials are butted and performed with the line-welding, the thickness of the welded material refers to the thickness of one welded material.

When the shoulder angle is negative, a height U from the base end portion of the probe portion 2 to the side surface, which is the straight surface of the shoulder portion 3, is preferably 0.2 mm or less. By setting the height U to 0.2 mm or less, a stirring force can be applied to the shoulder portion 3. When the shoulder angle is negative, it is preferable that the sum of the height T and the height U is 0.2 mm or more smaller than the thickness of the welded material. In such manner, it is possible to prevent the probe portion 2 from penetrating the welded material more than necessary.

It is preferable that at least the probe portion of the tool member 1 is made of a silicon nitride sintered body. Further, it is more preferable that the entire tool member 1 is made of a silicon nitride sintered body. If the tool member 1 is made of a silicon nitride sintered body, the probe portion 2 and the shoulder portion 3 are considered integrally formed of the silicon nitride sintered body.

The material of the tool member 1 according to the embodiment is not limited as long as the above space occupancy is available. On the other hand, when the welded material is a hard material such as an iron alloy, the strength of the tool member 1 is required. In particular, the strength of the probe portion 2 is required. Therefore, the probe portion 2 is preferably made of a silicon nitride sintered body. Further, by using the tool member 1 integrated with the silicon nitride sintered body, it is possible to acquire stirring by both the probe portion 2 and the shoulder portion 3 and to improve the durability of the tool member 1.

The average coefficient of linear expansion of the silicon nitride sintered body from room temperature to 200 degrees Celsius is preferably in the range of 1 to $3\times10^{-6}$/K. The coefficient of linear expansion indicates the rate between the expansion of the length of an object and the rising of the temperature. The coefficient of linear expansion shall be measured according to JIS (Japanese Industrial Standards)-R-1618. The temperature measurement range is from room temperature to 200 degrees Celsius. The average coefficient of linear expansion from room temperature to 200 degrees Celsius shall be applied as the coefficient of linear expansion. The average coefficient of linear expansion from room temperature to 800 degrees Celsius is preferably in the range of 2 to $4\times10^{-6}$/K.

In friction stir welding, the tool member is pressed against the welded material while being rotated at high speed. Therefore, the welded material and the tool member are exposed to a high temperature environment. When the coefficient of linear expansion of the silicon nitride sintered body is larger than $4\times10^{-6}$/K, the thermal expansion of the tool member becomes larger during the friction stir welding step. If the thermal expansion of the tool member becomes larger, the tool member may penetrate the welded material and come into contact with the backing material. A backing material is made of a high-strength material as described later. Therefore, when the tool member comes into contact with the backing material, the tool member can be damaged. Therefore, the coefficient of linear expansion of the silicon nitride sintered body from room temperature to 800 degrees Celsius is preferably $4\times10^{-}$/K or less.

The iron alloy constituting the welded material includes various alloys such as pure iron, carbon steel, tool steel, chrome molybdenum steel, stainless steel, manganese steel and cast iron. These linear expansion coefficients are in the range of 8 to $20\times10^{-6}$/K. When the coefficient of linear expansion of the silicon nitride sintered body is smaller than $1\times10^{-6}$/K, the difference in the coefficient of linear expansion between the silicon nitride sintered body and the iron alloy becomes larger. When the difference in the coefficient of linear expansion becomes larger, the stirring marks tend to be non-uniform. Further, iron alloy is often used as the jig for fixing the tool member 1. When the difference in the coefficient of thermal expansion becomes larger, the tool member 1 is loosened and the rotational force cannot be smoothly transmitted, thereby the stirring marks tend to be non-uniform. From this perspective as well, it is preferable that the difference in the coefficient of thermal expansion does not become larger.

Therefore, the tool member 1 made of a silicon nitride sintered body having an average coefficient of linear expansion from room temperature to 200 degrees Celsius in the range of 1 to $3\times10^{-6}$/K is preferable. In particular, the tool member 1 made of a silicon nitride sintered body having a coefficient of linear expansion from room temperature to 200 degrees Celsius in the range of 2 to $4\times10^{-6}$/K is preferable. By controlling the coefficient of linear expansion, it is possible to stabilize the entry degree of the tool member 1 into the welded material. Friction stir welding pushes the tool member 1 into the welded material while rotating it. At the stage of being pushed into the welded material, temperature of the tool member 1 rises from room temperature to 800 degrees Celsius or higher. Controlling the coefficient of linear expansion from room temperature to 200 degrees Celsius stabilizes the push-in amount at the initial push-in stage. Therefore, it is possible to make the stirring marks (welding marks) uniform.

The average coefficient of linear expansion according to JIS-R-1618 is applied as the coefficient of linear expansion. The average coefficient of linear expansion is acquired by measuring the amount of change in volume from room temperature to a target temperature to acquire an average value. Therefore, the coefficient of linear expansion changes depending on the target temperature. In order to stabilize the push-in amount in the initial stage, it is necessary to control the coefficient of linear expansion up to 200 degrees Celsius.

The silicon nitride sintered body preferably has a coefficient of linear expansion in the range of 2 to $4 \times 10^{-6}$/K at room temperature to 800 degrees Celsius. As described above, the temperature of the tool member becomes 800 degrees Celsius or higher. When the welded material is an iron alloy, the temperature of the tool member 1 rises to about 1000 to 1300 degrees Celsius. The iron alloy softens as the temperature rises. The iron alloy is hard when the temperature is about 500 to 700 degrees Celsius. By controlling the coefficient of linear expansion from room temperature to 800 degrees Celsius, it is possible to stabilize the push-in amount before the iron alloy softens.

Examples of the silicon nitride sintered body having an average coefficient of linear expansion from room temperature to 200 degrees Celsius in the range of 1 to $3 \times 10^{-6}$/K include the following.

That is, the silicon nitride sintered body preferably contains 20% by mass or less of an additive component other than silicon nitride. Such additive component contains three or more elements selected from Y, lanthanoid element, Al, Mg, Si, Ti, Hf, Mo, and C is preferable.

That is, the silicon nitride sintered body contains 20% by mass or less of the additive component. The additive component refers to a component other than silicon nitride. In the silicon nitride sintered body, an additive component other than silicon nitride and a sintering aid component are shown. The sintering aid component constitutes the grain boundary phase. If the amount of the additive component exceeds 20% by mass which is more than necessary, the grain boundary phase becomes excessive. The silicon nitride sintered body has a structure in which elongated β-silicon nitride crystal particles are intricately entwined. If the amount of the sintering aid component increased, an unremovable portion where the structure having silicon nitride crystal particles complicatedly entwined may be formed. Therefore, it is not desirable that the amount of the sintering aid component increases.

The amount of the additive component is preferably 3% by mass or more and 15% by mass or less. If the additive component is less than 3% by mass, the grain boundary phase may be too small and the density of the silicon nitride sintered body may decrease. If the additive component is specified to be 3% by mass or more, the sintered body having the relative density of 95% or more can be easily formed. Further, by specifying the additive component to be 5% by mass or more, the sintered body having the relative density of 98% or more can be easily formed.

Further, as the additive component, it is preferable to include three or more kinds of elements selected from Y, lanthanoid element, Al, Mg, Si, Ti, Hf, Mo and C. It is sufficient that Y (yttrium), lanthanoid element, Al (aluminum), Mg (magnesium), Si (silicon), Ti (titanium), Hf (hafnium), Mo (molybdenum), C (carbon) as an additive component is contained as a constituent element, and the form of existence thereof is not limited. Examples of forms thereof include oxides (including composite oxides), nitrides (including composite nitrides), oxynitrides (including composite oxynitrides), carbides (including composite carbides) and the like. Further, as the lanthanoid element, it is preferable to choose one from Yb (ytterbium), Er (erbium), Lu (ruthenium), and Ce (cerium).

As will be described later, as a sintering aid to be added in the manufacturing process, oxides (including composite oxides), nitrides (including composite nitrides), and carbides (composite carbides) are preferable. In the case of the Y element, yttrium oxide ($Y_2O_3$) is preferable. Further, as the lanthanoid element, it is preferable to choose one from ytterbium oxide ($Yb_2O_3$), erbium oxide ($Er_2O_3$), ruthenium oxide ($Lu_2O_3$), and cerium oxide ($CeO_2$).

In the case of the Al element, aluminum oxide ($Al_2O_3$), aluminum nitride (AlN), and MgO—$Al_2O_3$ spinel are preferable. In the case of Mg element, magnesium oxide (MgO) and MgO—$Al_2O_3$ spinel are preferable. In the case of Si element, silicon oxide ($SiO_2$) and silicon carbide (SiC) are preferable.

In the case of Ti element, titanium oxide ($TiO_2$) and titanium nitride (TiN) are preferable. Further, in the case of the Hf element, hafnium oxide ($HfO_2$) is preferable. In the case of Mo element, molybdenum oxide ($MoO_2$) and molybdenum carbide ($Mo_2C$) are preferable. Regarding the C element, it is preferable to be added as silicon carbide (SiC), titanium carbide (TiC), or titanium nitride (TiCN).

By combing and adding two or more of the above-mentioned additive components, it is possible to form a grain boundary phase containing three or more kinds of elements selected from Y, lanthanoid element, Al, Mg, Si, Ti, Hf, Mo, and C. Further, the additive component preferably contains 4 or more kinds of elements selected from Y, lanthanoid element, Al, Mg, Si, Ti, Hf, Mo and C.

Next, the silicon nitride powder and the sintering aid powder are firstly mixed, and then mixed using a ball mill to prepare a raw material powder. Next, a step of adding an organic binder to the raw material powder for molding is carried out. In the molding step, it is preferable to use a mold having the desired probe shape. Further, regarding the molding process, molding using mold, CIP (cold hydrostatic pressure and pressurization method), or the like may be used.

Next, the molded product obtained in the molding step is degreased. The degreasing step is preferably carried out by performing heating in nitrogen at a temperature of 400 to 800 degrees Celsius.

Next, the degreased body acquired in the degreasing step is sintered. The sintering step shall be performed at a temperature of 1600 degrees Celsius or higher. The sintering step is preferably to be performed in an inert atmosphere or in vacuum. Examples of the inert atmosphere include a nitrogen atmosphere and an argon atmosphere. Examples of the sintering step include normal pressure sintering, pressure sintering, and HIP (hot isostatic pressing method). Moreover, multiple kinds of sintering methods may be combined.

The upper limit of the sintering temperature is not particularly limited, but is preferably 1800 degrees Celsius or less. Sintering is possible even at temperatures above 1800 degrees Celsius. On the other hand, by setting the sintering temperature in the range of 1600 to 1800 degrees Celsius, the reaction between the sintering aids can be made uniform. Further, the lower the sintering temperature is, the more homogenized the reaction between the sintering aids will be. Therefore, the sintering temperature is preferably in the range of 1600 to 1800 degrees Celsius, and more preferably 1600 to 1700 degrees Celsius. In particular, it is preferable to perform the primary sintering in the range of 1600 to 1800 degrees Celsius, and more preferably 1600 to 1700 degrees Celsius. The primary sintering is a process of sintering a degreased body. The process of re-sintering the sintered body produced in the primary sintering step is called secondary sintering. In the production of the friction stir welding tool member, the secondary sintering is preferably performed by HIP. By HIP sintering, it is possible to acquire a dense sintered body.

It is preferable that the cooling speed after the primary sintering or the secondary sintering is 100 degrees Celsius/hour or less. Generally, when the sintering furnace is turned off, the temperature is rapidly cooled at the speed about 600 degrees Celsius/hour. By slow cooling at 100 degrees Celsius/hour or less, crystallization of the grain boundary phase, which will be described later, can be promoted. The slow cooling step may be performed after either or both the primary sintering and the secondary sintering.

Regarding the combination of the sintering aids added in the manufacturing process, the following combinations are preferable.

The first combination is a case where 0.1% to 1.7% by mass of MgO, 0.1% to 4.3% by mass of $Al_2O_3$, 0.1% to 10% by mass SiC, and 0.1% to 2% by mass of $SiO_2$ are added. In such manner, four elements of Mg, Al, Si, and C are contained as additives. When MgO and $Al_2O_3$ are added, 0.2% to 6% by mass may be added as $MgO$—$Al_2O_3$ spinel.

Further, 0.1% to 2% by mass of $TiO_2$ may be added to the first combination. By adding $TiO_2$ to the first combination, five elements of Mg, Al, Si, C and Ti are contained as additives.

The second combination is a case where 0.2% to 3% by mass of $Y_2O_3$, 0.5% to 5% by mass of $MgO$—$Al_2O_3$ spinel, 2% to 6% by mass of AlN, 0.5% to 3% by mass of $HfO_2$, and 0.1% to 3% by mass of $Mo_2C$ are added. In the second combination, six elements of Y, Mg, Al, Hf, Mo, and C are added as additives.

Further, instead of $Y_2O_3$, an oxide of a lanthanoid element may be used. In this case, six elements of lanthanoid elements, Mg, Al, Hf, Mo, and C are added.

The third combination is a case where 2% to 7% by mass of $Y_2O_3$, 3% to 7% by mass of AlN, and 0.5% to 4% by mass of $HfO_2$ are added. In such manner, additives include three elements of Y, Al, and Hf.

Further, instead of $Y_2O_3$, an oxide of a lanthanoid element may be used. In this case, three elements of lanthanoid element, Al, and Hf are included.

Further, in the first to third combinations, the upper limit of the content of the sintering aid component is 15% by mass or less in total.

None of the above first to third combinations include a combination of $Y_2O_3$ and $Al_2O_3$ as additives. The first combination does not use $Y_2O_3$. The second combination is added as $MgO$—$Al_2O_3$ spinel. The third combination does not use $Al_2O_3$. When performing sintering involving the combination of $Y_2O_3$ and $Al_2O_3$, yttrium aluminum oxides such as YAG ($Al_5Y_3O_{12}$), YAM ($Al_2Y_4O_9$), and YAL ($AlYO_3$) are likely to be formed. These yttrium aluminum oxides are inferior in heat resistance. The same influence remains even if Y is replaced with a lanthanoid element. Since the friction stir welding tool member is in a high temperature environment where the temperature of the friction surface reaches 800 degrees Celsius or higher, if the heat resistance is lowered, the durability of the welding tool member will be decreased.

Further, the above-mentioned additive component also has an excellent role as a sintering aid. Therefore, it is possible to increase the ratio of the β-type silicon nitride crystal particles having an aspect ratio of 2 or more to 60% or more. The ratio of the aspect ratio being 2 or more is acquired by the following procedure. That is, to perform a SEM observation on an arbitrary cross section of the silicon nitride sintered body and to take an enlarged photograph (magnification: 3000 times or more). Next, to measure the major axis and the minor axis of the silicon nitride crystal particles shown in the enlarged photograph to acquire the aspect ratio. The area ratio (%) of silicon nitride crystal particles having an aspect ratio of 2 or more per unit area of 50 μm×50 μm shall be acquired.

The silicon nitride sintered body preferably has a grain boundary phase crystallization rate of 50% or more. The grain boundary phase is formed by the reaction of the sintering aid components. By increasing the proportion of the crystal phase in the grain boundary phase, it becomes easier to control the coefficient of linear expansion. In order to increase the crystal phase, avoid using aluminum oxide ($Al_2O_3$) as a sintering aid is effective. Even though $Al_2O_3$ has a high sintering promoting effect, the acquired grain boundary phase tends to be an amorphous phase. The amorphous phase is also called the glass phase that tends to cause variations in the coefficient of linear expansion. Therefore, the crystallization rate of the grain boundary phase is preferably 50% or more, more preferably 70% or more. Further, since $Al_2O_3$ is not used as the sintering aid in the third combination as described above, the crystallization rate of the grain boundary phase can reach 70% or more. Based on this perspective as well, the third combination is preferable.

Further, by performing the above-mentioned slow cooling step, the first to third combinations are easy to control in which the crystallization rate of the grain boundary phase reach 50% or more, even 70% or more.

Further, the crystallization rate of the grain boundary phase can be analyzed using a transmission electron microscope (TEM) by observing any cross section of the silicon nitride sintered body using TEM, and acquiring the area ratio of the crystal phase in the grain boundary phase reflected in the unit area of 3 μm×3 μm. The area ratio (%) is calculated by the following formula.

Area ratio (%)=[total area of crystalline phase/(total area of amorphous phase+total area of crystalline phase)]

By performing the above process at any three locations, and the average value of which shall be the crystallization rate of the grain boundary phase.

By having the above configuration, it is possible to control the average coefficient of linear expansion from room temperature to 200 degrees Celsius within the range of 1 to 3×10$^{-6}$/K. Further, it is possible to control the average coefficient of linear expansion from room temperature to 800 degrees Celsius within the range of 2 to 4×10$^{-6}$/K. Further, the Vickers hardness of the silicon nitride sintered body being 1400 HV20 or more can be available. The fracture toughness value of the silicon nitride sintered body is preferably 6.0 MPa×m$^{1/2}$ or more. Further, the Vickers hardness being 1500 HV1 or more and the fracture toughness value being 6.5 MPa×m$^{1/2}$ or more can be available.

Further, the three-point bending strength being 900 MPa or more or even 1000 MPa or more can be available.

The three-point bending strength shall be measured according to JIS-R-1601 (2008). The ISO corresponding to JIS-R-1601 is ISO14704 (2000).

The fracture toughness value is acquired by "Shinbara's formula" using the IF method according to JIS-R-1607 (2015). The ISO corresponding to JIS-R-1607 is ISO/DIS21618 (2018).

The Vickers hardness is a measurement of HV20 (test force 196.1N) according to JIS-R-1610 (2003). The ISO corresponding to JIS-R-1610 is ISO14705 (2000).

JIS (Japanese Industrial Standards) is prioritized for each measurement, but ISO (International Organization for Standardization) may be referred to as appropriate.

The friction stir welding tool member 1 as described above is suitable for the friction stir welding method. Further, it is preferable that the advancing angle of the friction stir welding tool member 1 is 0.5° or more and 20° or less, or −20° or more and −0.5° or less. Here, the forward angle θ of the friction stir welding tool member 1 is an inclination angle formed by a direction perpendicular to the welded material 6 and the center line of the friction stir welding tool member 1.

FIG. 5 shows an example of the friction stir welding method. In particular, FIG. 5 shows the line-welding. In the figure, reference numeral "1" is a friction stir welding tool member, reference numeral "6" is a welded material, reference numeral "7" is a backing material, and reference numeral "θ" is the advance angle. The welded material 6 is provided on the backing material 7. Further, two sheets of the welded material 6 are stacked together. Further, the arrow indicates the moving direction of the tool member 1.

In the case of the point-welding, the advance angle θ is zero, and the tool member 1 is pushed in the direction perpendicular to the welded material 6.

Further, in the case of the line-welding, the tool member 1 is pushed in with a predetermined inclination (advance angle θ) with respect to the direction perpendicular to the welded material 6. Further, it is assumed that the tool member 1 is moved in the direction of the arrow. This predetermined inclination is defined as the advance angle θ. When the advance angle θ is zero, it means that the tool member is arranged in the direction perpendicular to the welded material.

Assuming the angle rising to the right is positive and the angle falling to the right is negative with respect to the moving direction of the tool member 1. In the point-welding, the advance angle θ=0°. Further, in the line-welding, the advance angle θ is preferably 0.5° or more and 20° or less, or −20° or more and −0.5° or less. In the line-welding, the tool member 1 performs welding while moving. When the advance angle θ is less than 0.5° (0° or more and less than 0.5°), the stress acting on the tool member 1 becomes larger when the tool member 1 is moved in the moving direction. Therefore, the durability of the tool member 1 is decreased.

Further, when the forward angle θ is larger than the 20°, the tool member 1 is difficult to deeply enter the welded material 6, which may result in a low welding strength between the welded materials 6. If the shoulder portion 3 is inserted too deeply, the durability will decrease. Therefore, the advancing angle θ is preferably 0.5° or more and 20° or less, and more preferably 2° to 10°. Further, the method of giving an inclination to the advance angle θ is suitable for the line-welding.

Similarly, if the advance angle θ is less than −20°, it is difficult for the tool member 1 to deeply enter the welded material 6. Further, when the advance angle θ exceeds −0.5° (more than −0.5° and 0° or less), the stress applied to the tool member 1 becomes larger when the tool member 1 is moved in the moving direction. Therefore, the advance angle θ is preferably −20° or more and −0.5° or less, and more preferably −10° or more and −2° or less. Further, it is preferable that the forward angle θ is positive between positive and negative angles, because it is easier to apply the stirring force to the welded material 6 when the advance angle θ is positive. When the advance angle θ is negative, it is effective when the welded material 6 is thin or when it is not desired to make a stirring mark on the back side of the welded material 6.

Further, it is preferable that the total amount of the advance angle θ and the shoulder angle α is within the range of −10° or more and 25° or less.

By controlling the total amount of the shoulder angle α and the advance angle θ, it is possible to reduce the stress acting on the shoulder portion 3 and enhance the stirring effect. As described above, the tool member 1 according to the embodiment has a curved surface processed portion 3a such that the outer peripheral edge of the shoulder portion 3 has a curved shape. By controlling the total amount of the shoulder angle α and the advance angle θ, it is possible to achieve both a stress reduction effect and an improvement in the stirring effect.

Further, when the shoulder angle α is negative, it is preferable that the shoulder angle α and the advance angle θ are set to be −3≤|α|−|θ|≤3°. By approximating the absolute values of the shoulder angle α and the advance angle θ, the occurrence of welding defect can be further suppressed. The shoulder portion 3 is in a state of being approximately parallel to the welded material 6. When |α|−|θ|=0, the shoulder portion 3 and the welded material 6 are parallel to each other.

As described above, the tool member 1 according to the embodiment has a curved surface processed portion 3a such that the outer peripheral edge of the shoulder portion 3 has a curved shape. Moreover, the shoulder angle α is given. The contact angle between the shoulder portion 3 and the welded material changes depending on the degree of the advance angle θ. By setting the total amount of the advance angle θ and the shoulder angle α within the range of −10° or more and 25° or less, it is possible to achieve both the stress reduction effect acting on the shoulder portion 3 and the improvement in the stirring effect. Further, the total amount of the advance angle θ and the shoulder angle α is preferably −10° or more and 25° or less, and more preferably 0° or more and 20° or less.

The thickness of the welded material 6 is preferably 0.1 mm or more. Further, it is more preferable that the thickness of the welded material 6 is 0.5 to 20 mm. The thickness of the welded material 6 is the thickness of one sheet. When the advance angle θ is controlled, the tool member 1 is pressed against the welded material 6 while being tilted at a predetermined angle θ. When the thickness of the welded material 6 is as thin as less than 0.1 mm, the tool member 1 may easily penetrate the welded material 6 and comes into contact with the backing material 7. Further, when the thickness of the welded material exceeds 20 mm, the stress acting on the tool member 1 increases and the durability of the tool member 1 decreases.

The welded material 6 is preferably an iron alloy. Examples of iron alloys include various alloys such as pure iron, carbon steel, tool steel, chrome molybdenum steel, stainless steel, manganese steel, and cast iron. These alloys have Vickers hardness (Hv) of 140 or more. The Vickers hardness (Hv) of aluminum is about 25. By forming the tool member 1 with a silicon nitride sintered body, it is possible to apply the tool member 1 to friction stir welding to a hard iron alloy.

It is preferable that the rotation speed of the tool member 1 is 200 rpm or more and the push-in load of the tool member 1 is 9.8 kN (1 ton) or more. Further, when performing the line-welding, it is preferable to set the moving speed to 200 mm/min or more. The rotation speed of the tool member 1 is preferably in the range of 200 rpm or more and 1000 rpm or less. If the rotation speed is less than 200 rpm, the stirring force may be insufficient. Further, when the rotation speed exceeds 1000 rpm, the stirring force becomes too strong and the unevenness of the welding marks of the welded material 6 becomes larger. When the unevenness of the welding mark becomes larger, the appearance of the welding portion deteriorates. Therefore, the rotation speed of the tool member 1 is preferably in the range of 200 to 1000 rpm, more preferably 400 to 800 rpm.

The push-in load is preferably in the range of 9.8 kN or more and 50 kN or less. If the push-in load is less than 9.8 kN, the stirring force becomes insufficient. Further, if the push-in load exceeds 50 kN, the life of the tool member 1 may be shortened. Therefore, the push-in load is more preferably in the range of 14 kN or more and 35 kN or less.

The rotational speed and push-in load of the tool member 1 can be applied to either the point-welding or the line-welding. Further, when performing the line-welding, the moving speed is preferably in the range of 300 mm/min or more and 1500 mm/min or less. If the moving speed is less than 300 mm/min, the speed is too slow and the mass productivity is lowered. On the other hand, when the moving speed exceeds 1500 rpm, the stirring force is partially reduced, and the welding strength between the welded materials is decreased. Therefore, the moving speed is preferably 300 to 1500 mm/min, more preferably 400 to 1000 mm/min.

With the above friction stir welding method, it is possible to achieve both high stirring force and durability of the tool member 1. Further, since the stirring force is made uniform, it is possible to eliminate the welding marks (stirring marks) and improve the aesthetic appearance of the welded portion.

By using the tool member 1 made of a silicon nitride sintered body having a controlled coefficient of linear expansion, it is possible to stably control the depth of entry of the tool member into the welded material, and to provide clean welding marks.

The evaluation of whether the welding marks are aesthetically pleasing shall be determined by whether there is any defect in the depth direction of the welded material 6. It is possible to observe the presence or absence of defect in the depth direction by an ultrasonic flaw detection test. Ultrasonic testing is a non-destructive testing method for structures. If ultrasonic waves propagate through a structure, and if there are an internal defect, the ultrasonic waves will be reflected from the defect, or the transmission of ultrasonic waves will be obstructed or attenuated. Ultrasonic testing is a method of detecting internal defects by utilizing these properties.

Since the depth of entry of the tool member 1 into the welded material is stably controlled, it is possible to prevent the tool member 1 from coming into contact with the backing material. Based on this perspective as well, the life of the tool member 1 can be extended.

The backing material is preferably formed of a material having a thermal conductivity of 30 W/m·K or less and a Vickers hardness (Hv) of 1400 or more. In order to fully utilize the frictional heat generated by the high-speed rotation of the tool member 1 for stirring and welding, the backing material is preferably formed of a material having low thermal conductivity. Further, in order to utilize the pressing force of the tool member 1 for friction stir welding, the backing material is preferably formed of a hard material. Further, the backing material is preferably formed of a silicon nitride sintered body. Further, the backing material is preferably formed of a silicon nitride sintered body having a linear expansion coefficient of 2 to $4\times10^{-6}$/K at room temperature to 800 degrees Celsius. The coefficient of linear expansion of the tool member 1 and the backing material is within the range of 2 to $4\times10^{-6}$/K. As a result, it is possible to control the depth of entry of the tool member 1 into the welded material more stably. Based on this perspective as well, it is possible to eliminate the welding marks and the improve aesthetic appearance.

The tool member 1 characterized in that the space occupancy (that is, the area ratio) determined on the basis of the projection drawing from the side surface direction is within the range of 30% to 70% has been described above. However, it is not limited to that case. For example, the space occupancy (that is, the volume fraction) of the three-dimensional space, as determined on the basis of three-dimensional shape of the tool member 1, in which neither the shoulder unit 3 nor the probe unit 2 exists may be in the range of 30% to 70%.

In that case, the tool member 1 has a shoulder portion 3 and a probe portion 2 that protrudes concentrically from the upper surface of the shoulder portion 3. In the tool member 1, the shoulder portion 3 includes a curved surface processed portion 3a which outer peripheral edge is curved so as to have a curved shape. With respect to the semi-cylindrical region formed by a circular lower surface having the outermost P of the curved surface processed portion 3a as an arc and a circular upper surface centered at the tip c of the probe portion 2, the space occupancy (that is, volume fraction) of the three-dimensional space in which neither the shoulder portion 3 nor the probe portion 2 exists in the semi-cylindrical region (or cylindrical region) is within the range of 30% to 70%. In this case, it is possible to acquire the same effect as when the space occupancy (e.g., the area rate) acquired from the projection drawing from the side direction is within the range of 30% to 70%.

A shape measuring instrument such as a three-dimensional measuring instrument (manufactured by KEYENCE) may be used for measuring the space occupancy (%) of the three-dimensional space in which the tool member 1 does not exist. By performing image analysis using a shape measuring instrument, it is possible to acquire the space occupancy of the three-dimensional space in which the tool member 1 does not exist, as in the case of acquiring the space occupancy of the two-dimensional space in which the tool member 1 does not exist.

Practical Examples

Practical Examples 1 to 13 and Comparative Examples 1 to 2

The materials shown in Table 1 are samples prepared for the tool member 1. The coefficient of linear expansion in Table 1 is a value from room temperature to 200 degrees Celsius. The coefficient of linear expansion is an average coefficient of linear expansion measured according to JIS- R-1618. The Vickers hardness is measured according to JIS-R-1610. The three-point bending strength was measured according to JIS-R-1601.

Further, the above-mentioned first to third combinations were used as the silicon nitride sintered body. The primary sintering was normal pressure sintering at 1600 to 1800 degrees Celsius. Then, as secondary sintering, HIP sintering was performed at 1600 to 1800 degrees Celsius. Further, the samples 1 and 2 were slowly cooled at a cooling speed of 100 degrees Celsius/hour or less after the primary sintering and the secondary sintering. Further, slow cooling was not performed on the sample 6 after sintering.

TABLE 1

| Sample No. | Material | Coefficient of linear expansion [×10⁻⁶/K] | Vickers hardness [Hv] | Three-point bending strength [MPa] |
|---|---|---|---|---|
| Sample 1 | Silicon nitride sintered body | 1.8 | 1520 | 1010 |
| Sample 2 | Silicon nitride sintered body | 2.4 | 1480 | 980 |
| Sample 3 | Ir alloy | 6.4 | 210 | 95 |
| Sample 4 | PCBN | 4.7 | 5000 | 1400 |
| Sample 5 | WC Carbide | 5.2 | 950 | 2000 |
| Sample 6 | Silicon nitride sintered body | 3.2 | 1380 | 900 |

In addition, the coefficient of linear expansion at room temperature to 800 degrees Celsius was examined with respect to the silicon nitride sintered bodies of the samples 1, 2, and 6. The samples 1 and 2 were in the range of 2 to $4\times10^{-6}$/K. The sample 6 was in the range of 4 to $5\times10^{-6}$/K.

The crystallization rate of the grain boundary phase was measured with respect to the silicon nitride sintered bodies of the samples 1, 2 and 6. The crystallization rate of the grain boundary phase was measured by TEM. The area ratio of the crystal phase in the grain boundary phase reflected in the unit area of 3 μm×3 μm was determined. The average value of the three unit areas was taken as the crystallization rate (%) of the grain boundary phase. According to the result of the measurement, the crystallization rate of the grain boundary phase of the samples 1 and 2 was 50% or more. Further, in the sample 6, the crystallization rate of the grain boundary phase was about 20%.

Based on the result, it was understood that the slow cooling after the sintering step (cooling speed of 100 degrees Celsius/hour or less) had the effect of increasing the crystallization rate of the grain boundary phase. Further, it was understood that the coefficient of linear expansion can be set in a preferable range by increasing the crystallization rate of the grain boundary phase.

Using the materials related to the samples 1 to 6, friction stir welding tool members 1 as shown in FIGS. 1 to 4 were made. The shapes of the tool member 1 are shown in Table 2. Further, the end surface 2a of the probe portion 2 had a curved shape and a polished surface having a surface roughness Ra of 0.2 μm or less. Further, the tool member 1 had an axisymmetric shape centered on the central axis C of the probe portion 2. Further, a curved surface processed portion 3a was formed such that the outer peripheral edge of each shoulder portion 3 had a curved shape. Further, the space occupancy (%) was acquired by obtaining the ratio of the two-dimensional space when the tool member 1 was photographed from the side surface direction.

When the shoulder angle θ is negative, the height U from the base end portion of the probe portion 2 to the side surface, which is the straight surface of the shoulder portion 3, is set to 0.2 mm or less.

TABLE 2

| Example No. | Sample No. | Outer diameter D [mm] | Probe diameter W [mm] | Probe portion height T [mm] | Shoulder angle [°] | Space occupancy [%] |
|---|---|---|---|---|---|---|
| Practical Example 1 | Sample 1 | 15 | 6 | 1.5 | +15 | 50 |
| Practical Example 2 | Sample 1 | 10 | 4 | 0.5 | +5 | 35 |
| Practical Example 3 | Sample 1 | 12 | 5 | 2.2 | +3 | 45 |
| Practical Example 4 | Sample 1 | 15 | 10 | 4.0 | −3 | 60 |
| Practical Example 5 | Sample 1 | 25 | 13 | 0.5 | −10 | 68 |
| Practical Example 6 | Sample 2 | 15 | 6 | 1.7 | +15 | 50 |
| Practical Example 7 | Sample 2 | 10 | 4 | 0.6 | +5 | 35 |
| Practical Example 8 | Sample 2 | 12 | 5 | 2.5 | +3 | 45 |
| Practical Example 9 | Sample 2 | 15 | 10 | 7.0 | −3 | 60 |
| Practical Example 10 | Sample 2 | 25 | 13 | 0.6 | −10 | 68 |
| Practical Example 11 | Sample 3 | 15 | 6 | 1.5 | +15 | 50 |
| Practical Example 12 | Sample 4 | 15 | 6 | 1.5 | +15 | 50 |
| Practical Example 13 | Sample 5 | 15 | 6 | 1.5 | +15 | 50 |
| Practical Example 14 | Sample 1 | 15 | 10 | 1.5 | −3 | 60 |
| Practical Example 15 | Sample 2 | 15 | 10 | 1.5 | −5 | 60 |
| Practical Example 16 | Sample 2 | 15 | 10 | 0.6 | −5 | 60 |
| Comparative Example 1 | Sample 6 | 15 | 3 | 1.9 | +18 | 25 |
| Comparative Example 2 | Sample 6 | 15 | 13 | 1.5 | +10 | 90 |

Friction stir welding was performed using the tool members according to the above practical examples and comparative examples. The conditions are as shown in Table 3. The welded materials were unified at SUS304. The Vickers hardness of SUS304 was Hv200. The pressing force was the pressing load of the tool member. In addition, two SUS304 plates were butted and welded with the line-welding. The welding conditions were unified at the line-welding. Therefore, the thickness of the welded material shown in Table 3 was the thickness of one SUS304 plate.

TABLE 3

| | Welded material [Thickness mm] | Rotation speed of tool member [rpm] | Pressing pressure [kN] | Advance angle [°] | Moving Speed [mm/min] |
|---|---|---|---|---|---|
| Welding Condition 1 | 1 | 400 | 29.4 | 0.5 | 500 |
| Welding Condition 2 | 1 | 500 | 29.4 | 1 | 500 |
| Welding Condition 3 | 2 | 600 | 29.4 | 3 | 600 |
| Welding Condition 4 | 3 | 600 | 29.4 | 5 | 700 |
| Welding Condition 5 | 5 | 800 | 29.4 | 15 | 600 |
| Welding Condition 6 | 10 | 800 | 29.4 | 15 | 500 |
| Welding Condition 7 | 2 | 250 | 29.4 | 5 | 400 |

The tool member according to the practical examples and comparative examples were subjected to the friction stir welding in the welding conditions 1 to 6. Regarding the welding performance, the depth of the welding mark and the tensile strength of the welded material were measured after forming the welding portion of 1 m and the welding portion of 10 m, respectively. The tensile strength was measured according to JIS-Z-3111 (2005). Incidentally, the reference example 1 was acquired by carrying out the friction stir welding using the tool member of the practical example 4 under the welding condition 1. Further, the reference example 2 was acquired by carrying out friction stir welding using the tool member of the practical example 8 under the welding condition 7. The reference example 1 shows a case where a total of the advancing angle and the shoulder angle was outside the preferable range.

Further, the presence or absence of defect in the welding marks after forming the welding portion of 10 m was investigated. The presence or absence of defect was observe using an ultrasonic flaw detection tester. In addition, the welding portion of 1 m was formed by continuously welding 50 cm twice. The welding portion of 10 m was formed by continuously welding 50 cm 20 times.

The investigation results are shown in Table 4 below.

As clearly known from the results shown in Table 4 above, excellent results were acquired in the friction stir welding method using the tool members according to each practical example. In the case of using the tool member according to each practical example, excellent welding was confirmed after the formation of the welding portion of 1 m.

In particular, those using a tool member made of a silicon nitride sintered body showed excellent durability. In addition, there were no defects in the welding marks after the formation of the 10 m welding portion, and a good appearance was acquired. On the other hand, it was understood that the tool members according to the practical examples 11 to 13 had a decrease in welding strength after the formation of the welding portion of 10 m. Further, as in the reference example 1, when the total of the shoulder angle $\alpha$ and the advance angle $\theta$ is outside the range of $-9°$ to $25°$, the welding strength after forming the welding portion of 10 m is decreased. This is because the contact angle between the shoulder portion and the welded material is not good.

Further, the practical examples 14 to 16 were set in the range of $-3 \leq |\alpha| - |\theta| \leq 3$ when the shoulder angle was minus. The amount of change in the welding depth between 1 m and 10 m was 0 mm or more and 0.01 mm or less. It is

TABLE 4

| Example No. | Welding Condition | Total of shoulder angle and advance angle [°] | After forming 1 m welding portion | | After forming 10 m welding portion | | Presence or Absence of defect in welding mark |
|---|---|---|---|---|---|---|---|
| | | | Depth of welding mark [mm] | Tensile hardness [mPa] | Depth of welding mark [mm] | Tensile hardness [mPa] | |
| Practical Example 1 | Welding Condition 3 | +18 | 1.72 | 700 | 1.75 | 700 | Absence |
| Practical Example 2 | Welding Condition 1 | +6.5 | 0.69 | 695 | 0.71 | 695 | Absence |
| Practical Example 3 | Welding Condition 4 | +8 | 2.82 | 690 | 2.85 | 686 | Absence |
| Practical Example 4 | Welding Condition 5 | 12 | 4.13 | 700 | 4.18 | 700 | Absence |
| Practical Example 5 | Welding Condition 2 | −9 | 0.62 | 688 | 0.65 | 679 | Absence |
| Practical Example 6 | Welding Condition 3 | +18 | 1.84 | 700 | 1.88 | 700 | Absence |
| Practical Example 7 | Welding Condition 1 | +6.5 | 0.80 | 690 | 0.83 | 688 | Absence |
| Practical Example 8 | Welding Condition 4 | +8 | 2.74 | 700 | 2.76 | 696 | Absence |
| Practical Example 9 | Welding Condition 6 | +12 | 7.89 | 700 | 8.02 | 700 | Absence |
| Practical Example 10 | Welding Condition 2 | −9 | 0.74 | 690 | 0.77 | 683 | Absence |
| Practical Example 11 | Welding Condition 3 | +18 | 1.73 | 700 | 1.78 | 660 | Presence |
| Practical Example 12 | Welding Condition 3 | +18 | 1.75 | 700 | 1.79 | 660 | Presence |
| Practical Example 13 | Welding Condition 3 | +18 | 1.75 | 700 | 1.78 | 640 | Presence |
| Practical Example 14 | Welding Condition 7 | +2 | 1.62 | 700 | 1.62 | 692 | Absence |
| Practical Example 15 | Welding Condition 7 | 0 | 1.63 | 700 | 1.63 | 695 | Absence |
| Practical Example 16 | Welding Condition 2 | −2 | 0.63 | 696 | 0.64 | 690 | Absence |
| Comparative Example 1 | Welding Condition 3 | +18 | 1.92 | 700 | — | — | — |
| Comparative Example 2 | Welding Condition 3 | +18 | 1.88 | 620 | — | — | — |
| Reference Example 1 | Welding Condition 1 | +30 | 1.88 | 700 | 1.93 | 510 | Presence |
| Reference Example 2 | Welding Condition 6 | +20 | 2.00 | 120 | 2.00 | 100 | Absence | understood that within this range, the welding depth is stable and the welding quality is improved.

Further, in the case where the space occupancy is out of the range as in the comparative examples 1 and 2, the tool member was damaged before the welding portion of 10 m was formed.

Further, as in the reference example 1, when the total of the shoulder angle α and the advance angle θ is out of the preferable range, a defect is formed. This is because the way of contact between the shoulder portion and the welded material is not desirable.

Further, as in the reference example 2, when the height T of the probe portion is larger than the plate thickness of the welded material, the welding strength is lowered. This indicates that it is not good for the probe to penetrate the welded material in the line-welding. Thus, the importance of adjusting the shoulder angle α and the advance angle θ is known.

Further, the depth of the welding marks and the presence or absence of defect in the welding marks were examined when two or three SUS304 plates having a thickness of 1 mm were stacked and welded with the line-welding. As the tool members, those of the practical examples 1, 8, 14 and 15 were used. Further, it was carried out under the welding condition 2. The results are shown in Table 5.

TABLE 5

| Example No. | Number of SUS plates stacked | After forming 1 m welding portion Depth of welding mark [mm] | After forming 10 m welding portion Depth of welding mark [mm] | Presence or Absence of defect in welding mark |
|---|---|---|---|---|
| Practical Example 1 | 2 | 1.67 | 1.70 | Absence |
| Practical Example 8 | 3 | 2.70 | 2.75 | Absence |
| Practical Example 14 | 2 | 1.58 | 1.59 | Absence |
| Practical Example 15 | 2 | 1.58 | 1.58 | Absence |

As understood from Table 5, excellent characteristics were acquired even when the SUS plates were stacked and performed with the line-welding.

As described above, according to at least one embodiment described above, it is possible to provide a friction stir welding tool member having a long life.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A friction stir welding tool member having a shoulder portion and a probe portion concentrically projecting from an upper surface of the shoulder portion, wherein
    the shoulder portion includes a curved surface processed portion that is curved to have a curved shape on an outer peripheral edge of the shoulder portion,
    the probe portion and the shoulder portion are made of a silicon nitride sintered body: having a crystallization ratio of a grain boundary phase of 50% or more; and having an average coefficient of linear expansion from room temperature to 800 degrees Celsius of 2 to $4 \times 10^{-6}$/K,
    a space occupancy occupied by a two-dimensional space in which neither the shoulder portion nor the probe portion exists is in a range of 30% to 70%, the space occupancy being determined based on a projection drawing of a rectangular side surface region having a tip of the probe portion and an outermost point P of the curved surface processed portion as diagonal points, the tip being on a central axis, and
    a shoulder angle is in a range of −15° or more and +15° or less, the shoulder angle being formed by an inclined surface from a root of the probe portion to the curved surface processed portion and an orthogonal surface orthogonal to a central axis of the probe portion, a positive of the shoulder angle showing the inclined surface rising toward an outside.

2. The friction stir welding tool member according to claim 1, wherein an outer diameter D of the shoulder portion is 5 mm or more and 30 mm or less.

3. The friction stir welding tool member according to claim 1, wherein an outer diameter W of the probe portion is 2 mm or more and 15 mm or less.

4. The friction stir welding tool member according to claim 1, wherein an average coefficient of linear expansion of the silicon nitride sintered body from room temperature to 200 degrees Celsius is in a range of 1 to $3 \times 10^{-6}$/K.

5. A friction stir welding method, comprising
    pressing the friction stir welding tool member according to claim 1 against a welded material, and integrally welding the welded material by using a frictional heat generated in a pressing portion.

6. The friction stir welding method according to claim 5, wherein an advance angle of the friction stir welding tool member is within a range of 0.5° or more and 20° or less, or −20° or more and −0.5° or less.

7. The friction stir welding method according to claim 5, wherein a thickness of the welded material is set to 0.1 to 20 mm.

8. The friction stir welding method according to claim 5, wherein a total of a shoulder angle and an advance angle is within a range of −10° or more and 25° or less, the shoulder angle being formed by an inclined surface from a root of the probe portion to the curved surface processed portion and an orthogonal surface orthogonal to a central axis of the probe portion.

9. The friction stir welding method according to claim 6, wherein when a shoulder angle is minus, the shoulder angle being formed by an inclined surface from a root of the probe portion to the curved surface processed portion and an orthogonal surface orthogonal to a central axis of the probe portion, $-3 \leq |\alpha| - |\theta| \leq 3$ is satisfied, where α is the shoulder angle and θ is an advance angle.

* * * * *